US012806462B2

(12) United States Patent
Kjellman

(10) Patent No.: US 12,806,462 B2
(45) Date of Patent: Nov. 24, 2026

(54) TRIGGER DEVICE AND FIRE SUPPRESSION SYSTEM COMPRISING TRIGGER DEVICE

(71) Applicant: Kidde-Fenwal, LLC, Ashland, MA (US)

(72) Inventor: Thomas Kjellman, Uxbridge, MA (US)

(73) Assignee: Kidde-Fenwal, LLC, Ashland, MA (US)

( * ) Notice: Subject to any disclaimer, the term of this patent is extended or adjusted under 35 U.S.C. 154(b) by 212 days.

(21) Appl. No.: 18/479,792

(22) Filed: Oct. 2, 2023

(65) Prior Publication Data

US 2024/0115895 A1 Apr. 11, 2024

Related U.S. Application Data

(60) Provisional application No. 63/378,456, filed on Oct. 5, 2022.

(51) Int. Cl.

*A62C 37/46* (2006.01)
*A62C 3/00* (2006.01)
*A62C 37/42* (2006.01)

(52) U.S. Cl.

CPC .............. *A62C 37/46* (2013.01); *A62C 3/006* (2013.01); *A62C 37/42* (2013.01)

(58) Field of Classification Search

CPC ......... A62C 37/46; A62C 3/006; A62C 37/42; A62C 37/12; F16K 1/2007
USPC .............................. 169/5, 65, 59, 42; 137/72
See application file for complete search history.

(56) References Cited

U.S. PATENT DOCUMENTS 365,639 A * 6/1887 Shaffer ................ A62C 35/605 340/289
3,378,081 A * 4/1968 O'Reilly ................ A62C 37/42 169/17
3,407,879 A * 10/1968 O'Rear .................. A62C 3/006 169/30
3,448,808 A * 6/1969 Olson .................... A62C 3/006 169/59
3,642,071 A * 2/1972 Utesch, Jr. ............. A62C 3/065 137/71

(Continued)

FOREIGN PATENT DOCUMENTS

CN 104906737 A * 9/2015 ............. A62C 37/48
EP 2711053 A1 * 3/2014 ............. A62C 37/42

*Primary Examiner* — Kevin Edward Schwartz
(74) *Attorney, Agent, or Firm* — Honigman LLP; Andrew J. Boes

(57) ABSTRACT

A trigger device is disclosed including a body including first and second ends. The first end is configured to be operatively coupled to a tensioned line of a mechanical fire detection line. The trigger device includes a piston configured to be slidably disposed along a length of the body, the piston configured to be operatively coupled to the tensioned line. The trigger device includes slots provided on the body configured to receive actuation cables. The trigger device further includes a coupling element configured to be coupled to the piston and configured to slidably move responsive to movement of the piston. The coupling element includes a free end configured to move through the slots to selectively couple with the actuation cable. responsive to the piston moving towards the second end of the body, the coupling element moves out of the slots to decouple with the actuation cable.

18 Claims, 6 Drawing Sheets

(56) References Cited

U.S. PATENT DOCUMENTS

| | | | | | |
|---|---|---|---|---|---|
| 3,722,597 | A * | 3/1973 | Friedman | A62C 37/08 | 169/42 |
| 6,286,604 | B1 * | 9/2001 | Ou | A62C 37/46 | 169/56 |
| 2015/0231432 | A1 * | 8/2015 | Zlatintsis | A62C 37/46 | 169/61 |
| 2020/0338376 | A1 * | 10/2020 | Kjellman | A62C 37/42 | |
| 2021/0213312 | A1 * | 7/2021 | Anderson | A62C 37/42 | |
| 2023/0149757 | A1 * | 5/2023 | VerBrugge | A62C 37/42 | 169/42 |

* cited by examiner

TRIGGER DEVICE AND FIRE SUPPRESSION SYSTEM COMPRISING TRIGGER DEVICE

CROSS-REFERENCE TO RELATED APPLICATION

This patent application claims the benefit of priority of U.S. Provisional Patent Application No. 63/378,456, filed on Oct. 5, 2022.

TECHNICAL FIELD

This invention relates to the field of fire suppression systems, and more particularly, to a trigger device for use with a mechanical fire detection line of a fire suppression system.

BACKGROUND

Fire suppression systems for industrial and commercial applications may include mechanical fire detection lines, which may include sensors to detect fires. The mechanical fire detection lines further include one or more tensioned lines that couple the sensors together. Once a fire is detected by any sensor, the sensor breaks, and the tensioned lines that were previously held under tension are now lax. This loss in tension may be used as a control signal to activate a control box to deploy countermeasures to limit the fire. Typically, the control signal is provided to a trigger device, which then actuates the control box. In cable-operated fire suppression systems, the trigger device may be activated by a pneumatic piston. As the pneumatic piston activates, the trigger device may release components or a secondary cable to further actuate the control box. In order for the trigger device to optimally function, there is a need for the piston to be under pressure from a pneumatic line. Use of a pneumatic line further complicates the system, and the use of high-pressure pneumatic lines may further increase potential for hazardous conditions in hot environments where the fire suppression system is generally used. Further, any failure in the pneumatic line may cause a malfunction of the trigger device, thereby rendering the fire suppression system ineffective. There is, therefore, a need for a means to activate the trigger device without need of a pneumatic line to drive the piston of the trigger device.

SUMMARY

Disclosed herein is a trigger device for a fire suppression system. The trigger device includes a body including first and second ends. The first end is configured to be operatively coupled to a tensioned line of a mechanical fire detection line of a fire suppression system. The trigger device further includes a piston configured to be slidably disposed along a length of the body. The piston includes a piston head and a connecting rod. A free end of the connecting rod extends towards the first end and is configured to be coupled to the tensioned line of the mechanical fire detection line. The trigger device further includes one or more slots provided on the body, towards the second end of the body. At least one of the one or more slots is configured to receive an actuation cable. The trigger device further includes a coupling element coupled to the piston head and configured to slidably move along the length of the body of the trigger device responsive to movement of the piston head. The coupling element includes a free end configured to move through the at least one of the one or more slots to selectively couple with the actuation cable. Responsive to the piston moving towards the second end of the body, the coupling element moves out of the at least one of the one or more slots to decouple with the actuation cable.

In one or more embodiments, the trigger device further includes a hook coupled to the free end of the connecting rod. The hook is configured to couple to the tensioned line.

In one or more embodiments, responsive to the tensioned line losing tension, the piston is pushed towards the second end of the body.

In one or more embodiments, the coupling element includes a coupling element hook to selectively couple with the actuation cable.

In one or more embodiments, the actuation cable includes a ring configured to selectively couple the actuation cable to the coupling element. Responsive to the coupling element hook moving in to the at least one of the one or more slots, the coupling element hook engages with the ring of the actuation cable. Responsive to the coupling element hook moving out of the at least one of the one or more slots, the coupling element hook disengages with the ring of the actuation cable.

In one or more embodiments, the coupling element includes one or more coupling element hooks to selectively couple with one or more actuation cables received within corresponding one or more slots.

In one or more embodiments, the trigger device further includes a compressible element disposed between the piston head and the first end of the body. The compressible element is configured to be in the compressed state when the piston head is located towards the first end of the body.

In one or more embodiments, the trigger device further includes a compressible element disposed between the piston head and the second end of the body. The compressible element is configured to be in the extended state when the piston head is located towards the first end of the body.

In one or more embodiments, the compressible element in a helical spring.

Also disclosed herein is a fire suppression system including a trigger device for a mechanical fire detection line. The trigger device includes a body including first and second ends. The first end is configured to be operatively coupled to a tensioned line of a mechanical fire detection line of a fire suppression system. The trigger device further includes a piston configured to be slidably disposed along a length of the body. The piston includes a piston head and a connecting rod. A free end of the connecting rod extends towards the first end and is configured to be coupled to the tensioned line of the mechanical fire detection line. The trigger device further includes one or more slots provided on the body, towards the second end of the body. At least one of the one or more slots is configured to receive an actuation cable. The trigger device further includes a coupling element coupled to the piston head and configured to slidably move along the length of the body of the trigger device responsive to movement of the piston head. The coupling element includes a free end configured to move through the at least one of the one or more slots to selectively couple with the actuation cable. Responsive to the piston moving towards the second end of the body, the coupling element moves out of the at least one of the one or more slots to decouple with the actuation cable.

In one or more embodiments, the trigger device further includes a hook coupled to the free end of the connecting rod. The hook is configured to couple to the tensioned line.

In one or more embodiments, responsive to the tensioned line losing tension, the piston is pushed towards the second end of the body.

In one or more embodiments, the coupling element includes a coupling element hook to selectively couple with the actuation cable.

In one or more embodiments, the actuation cable includes a ring configured to selectively couple the actuation cable to the coupling element. Responsive to the coupling element hook moving in to the at least one of the one or more slots, the coupling element hook engages with the ring of the actuation cable. Responsive to the coupling element hook moving out of the at least one of the one or more slots, the coupling element hook disengages with the ring of the actuation cable.

In one or more embodiments, the coupling element includes one or more coupling element hooks to selectively couple with one or more actuation cables received within corresponding one or more slots.

In one or more embodiments, the trigger device further includes a compressible element disposed between the piston head and the first end of the body. The compressible element is configured to be in the compressed state when the piston head is located towards the first end of the body.

In one or more embodiments, the trigger device further includes a compressible element is disposed between the piston head and the second end of the body. The compressible element is configured to be in the extended state when the piston head is located towards the first end of the body.

In one or more embodiments, the compressible element in a helical spring.

The foregoing summary is illustrative only and is not intended to be in any way limiting. In addition to the illustrative aspects, embodiments, and features described above, further aspects, embodiments, features, and techniques of the invention will become more apparent from the following description taken in conjunction with the drawings.

BRIEF DESCRIPTION OF THE DRAWINGS

The accompanying drawings are included to provide a further understanding of the subject disclosure of this invention and are incorporated in and constitute a part of this specification. The drawings illustrate exemplary embodiments of the subject disclosure and, together with the description, serve to explain the principles of the subject disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the subject disclosure as defined by the appended claims.

Various terms are used herein. To the extent a term used in a claim is not defined below, it should be given the broadest definition persons in the pertinent art have given that term as reflected in printed publications and issued patents at the time of filing.

In the specification, reference may be made to the spatial relationships between various components and to the spatial orientation of various aspects of components as the devices are depicted in the attached drawings. However, as will be recognized by those skilled in the art after a complete reading of the subject disclosure, the components of this invention. described herein may be positioned in any desired orientation. Thus, the use of terms such as “above,” “below,” “upper,” “lower,” “first”, “second” or other like terms to describe a spatial relationship between various components or to describe the spatial orientation of aspects of such components should be understood to describe a relative relationship between the components or a spatial orientation of aspects of such components.

Figure 1:
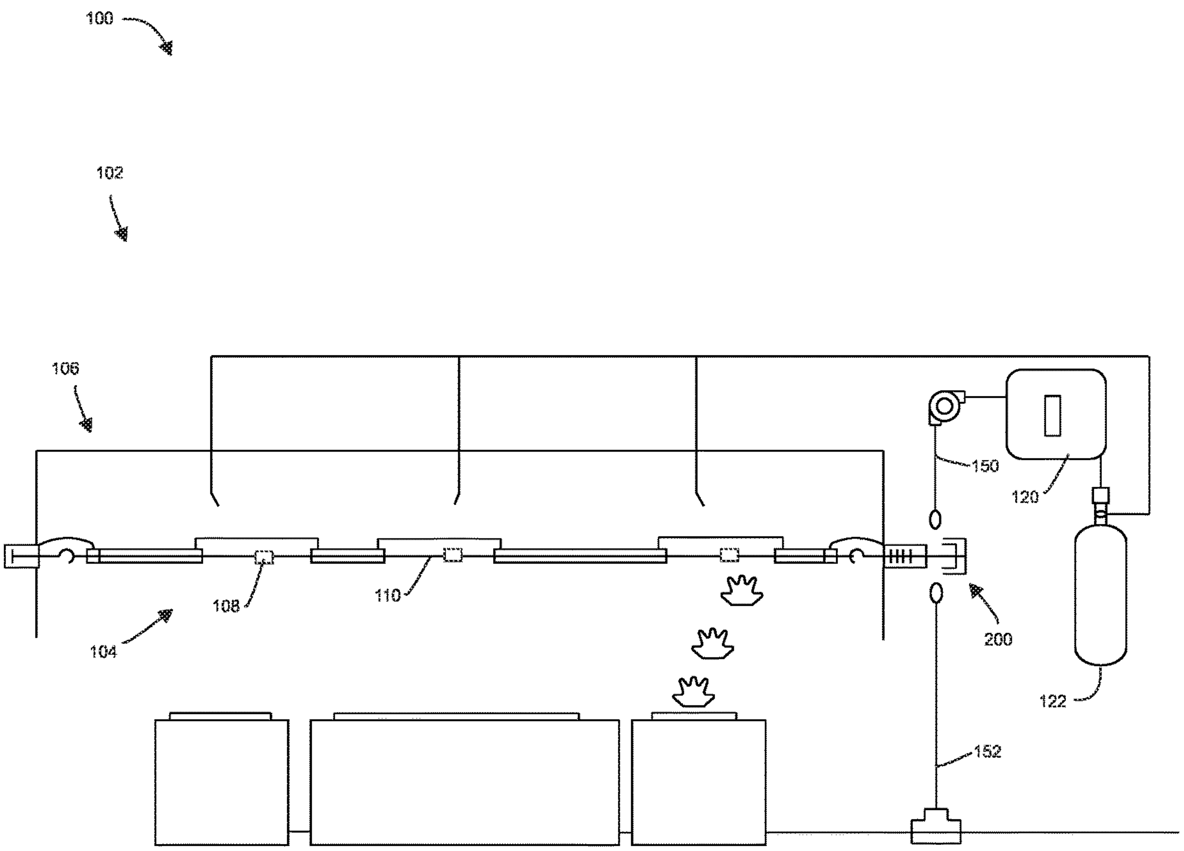
FIG. 1 is an exemplary schematic view of a fire suppression system diagram illustrating an exemplary fire suppression system in accordance with one or more embodiments of the invention.

Referring to FIG. 1, an exemplary schematic view of a fire suppression system 100 is shown. The fire suppression system 100 may be used in industrial and commercial applications. In the illustrated view of FIG. 1, the fire suppression system 100 is one used in a commercial cooking application 102. The fire suppression system 100 includes a mechanical fire detection line 104 disposed within a hood 106 of the commercial cooking application 102. The mechanical fire detection line 104 may include one or more sensors 108 that are linked together via a tensioned line 110. When a fire may break out, the heat of the fire may cause one or more sensors 108 to break, thereby causing a drop in a tension of the tensioned line 110. This decrease in the tension of the tensioned line 110 may be used as a control signal to operate a control box 120. The control box 120 may then deploy countermeasures to suppress the fire that broke out. The countermeasures may include dispensing a fire suppression agent that is stored in a cannister 122.

The decrease in tension may be routed through a trigger device 200, which then further actuates the control box 120. The trigger device 200 may be a part of the mechanical fire detection line 104 or may be kinematically coupled to it. The decrease in tension causes a piston present in the trigger device to retreat. As the piston retreats, it causes cables connected to the trigger device to be released, which further actuate the control box. The trigger device 200 may further include actuation cables 150, 152 to activate secondary functions, such as closure of ventilation dampers in a kitchen in case of a fire. The secondary functions may also be activated by release of the actuation cables 150, 152 connected to the trigger device 200.

Figure 2A:
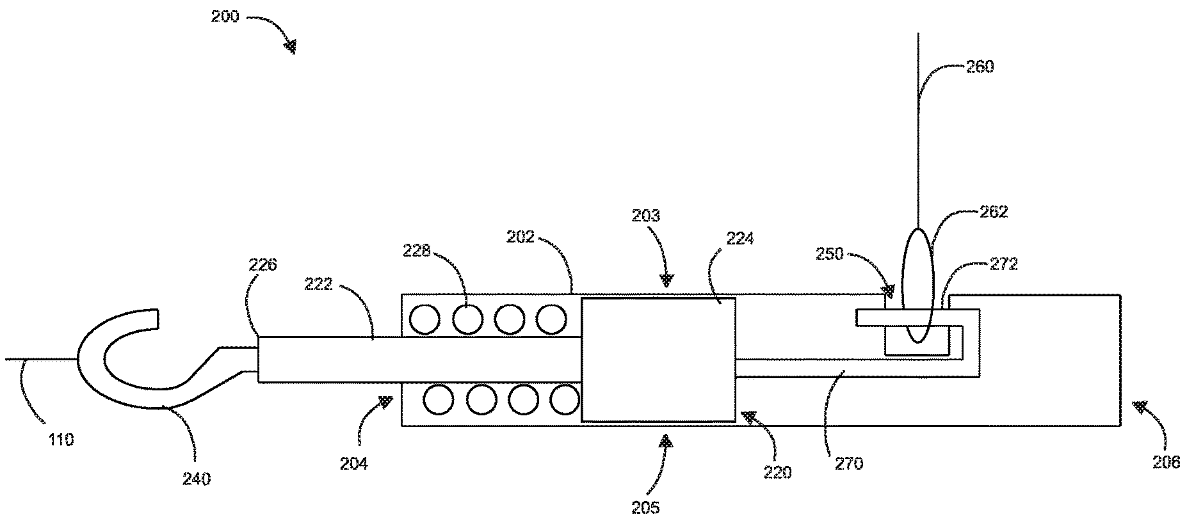
FIG. 2A is a schematic sectional view of a trigger device in a secured state, in accordance with one or more embodiments of the invention.
Figure 2B:
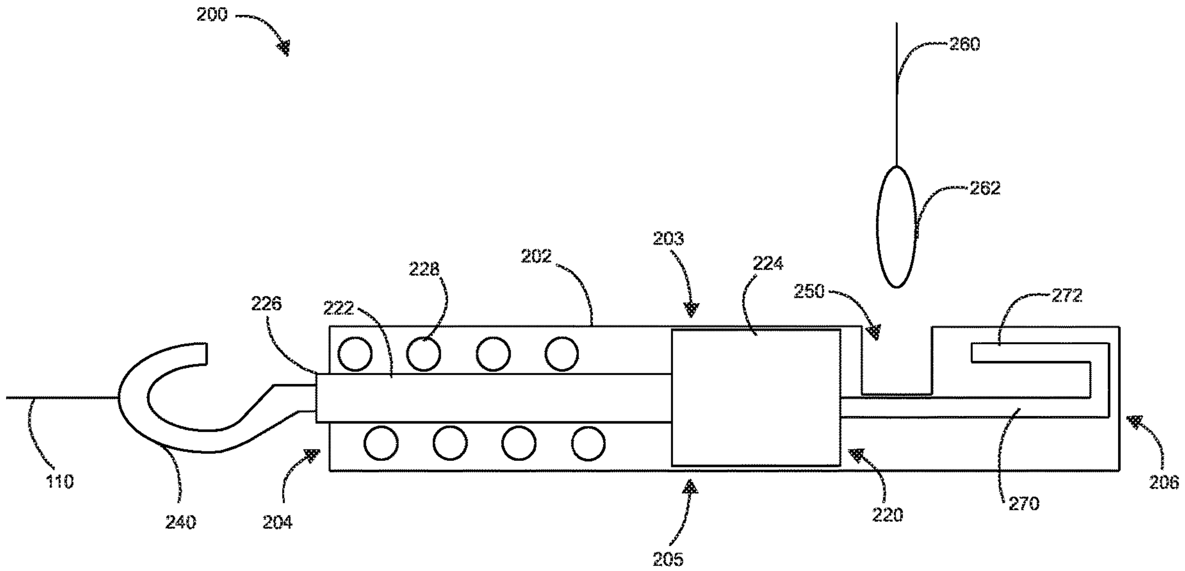
FIG. 2B is a schematic sectional view of the trigger device in a triggered state, in accordance with one or more embodiments of the invention.

FIGS. 2A and 2B show exemplary schematic views of the trigger device 200 in a secured state and a triggered state, respectively. In some embodiments, the secured state of the trigger device 200 may be defined as a state when the trigger device 200 is still securing the actuation cable. In such a state, the tension in the tensioned lines 210 are still holding and there is not hazardous fire condition that requires the actuation of fire suppression. In some embodiments, the triggered state of the trigger device 200 may be defined as a state when the trigger device 200 has released the actuation cable. Such a state may occur when, due to a fire, one or more sensors 108 of the mechanical fire detection line breaks, causing a loss in tension of the tensioned lines 110. The release of the actuation cables may further activate the control box 120, or the other secondary functions required for fire suppression.

The trigger device 200 includes body 202 including first and second ends 204, 206. The first end 204 is coupled to the tensioned line 110 of the mechanical fire detection line 106 of the fire suppression system 100. The trigger device 200 further includes a piston 220 including a connecting rod 222 coupled to a piston head 224. The piston 220 is disposed within the body 202 of the trigger device 200 and is adapted to slide along a length of the trigger device 200. The connecting rod 222 includes a free end 226 that extends outside of the body 202 of the trigger device 200. The free end 226 of the connecting rod 222 is adapted to be coupled to the tensioned lined 110. In some embodiments, the trigger device 200 may include a hook 240 coupled to the free end 226 of the connecting rod 222. In some embodiments, the hook 240 may be coupled to the tensioned line 110. The trigger device 200 further includes a compressible element 228 disposed within the body 202 of the trigger device 200 and arranged between the piston head 224 and the first end 204 of the body 202 of the trigger device 200. The compressible element 228 is arranged such that, as the piston head 224 moves towards the first end 204 of the body 202 of the trigger device 200, the compressible element 228 is compressed and thereby, offers a resistance to motion of the piston head 224. In other words, as the tension in the tensioned line 110 is intact, the piston head 224 is pulled towards the first end of the body 202 of the trigger device 200, and the compressible element 228 is in a compressed state. In some embodiments, the compressible element 228 includes a helical spring.

The trigger device 200 further includes one or more slots provided on the body 202. In the illustrated embodiment of FIG. 2A, the trigger device 200 includes one slot 250 provided on a side 203 of the body 202 of the trigger device 200. However, in some other embodiments, the slot 250 may be provided on a side 205 of the body 202 of the trigger device 200. The one or more slots 250 are each configured to receive an actuation cable. In the illustrated embodiment of FIG. 2A, the slot 250 receives the actuation cable 260. In some embodiments, the actuation cable 260 may include a ring 262. The ring 262 may be received by the slot 250. The trigger device 200 further includes a coupling element 270 coupled to the piston head 224. The coupling element 270 is configured to slidably move along the length of the body 202 of the trigger device 200, in correspondence with a movement of the piston head 224. In some embodiments, the coupling element 270 may be a rod. The coupling element 270 includes a free end that is configured to move through at least one of the one or more slots 250. In the illustrated embodiment of FIG. 2A, the coupling element 270 moves through the slot 250. When the coupling element 270 moves through the slot 250, the coupling element is configured to selectively couple with the actuation cable 260. In some embodiments, the free end of the coupling element 270 includes a coupling element hook 272 to selectively couple with the actuation cable 260 via the ring 262 of the actuation cable 260.

Referring now to FIGS. 1 and 2A, the trigger device 200 is in a secured state. In such a state, the coupling element 270 is coupled with the actuation cable 260 via the ring 262 of the actuation cable 260. Here, the piston head 224 is towards the first end 204 of the body 202 and is held there by the tension in the tensioned line 110. As a result, the coupling element 270 is also coupled with the actuation cable 260, locking the actuation cable 260.

Referring now to FIGS. 1 and 2B, the trigger device 200 is in a triggered state. In such a state, the coupling element 270 is decoupled from the actuation cable 260, resulting in the release of the actuation cable 260. In such a state, due to a breakage in one or more sensors 108, there is a loss of tension in the tensioned line 110. As a result, the piston head 224 is not held in position at the first end 206. The force of the compressed compressible element 228 pushes the piston head 224 towards the second end 206 of the body 202. As the piston head 224 moves towards the second end 206, the coupling element 270 also correspondingly moves towards the second end 206, and consequently, the free end of the coupling element 270 moves out of the slot 250, thereby decoupling with the ring 262 of the actuation cable 260. Hence, the actuation cable 260 is released, and the control box 120 is activated.

Figure 3A:
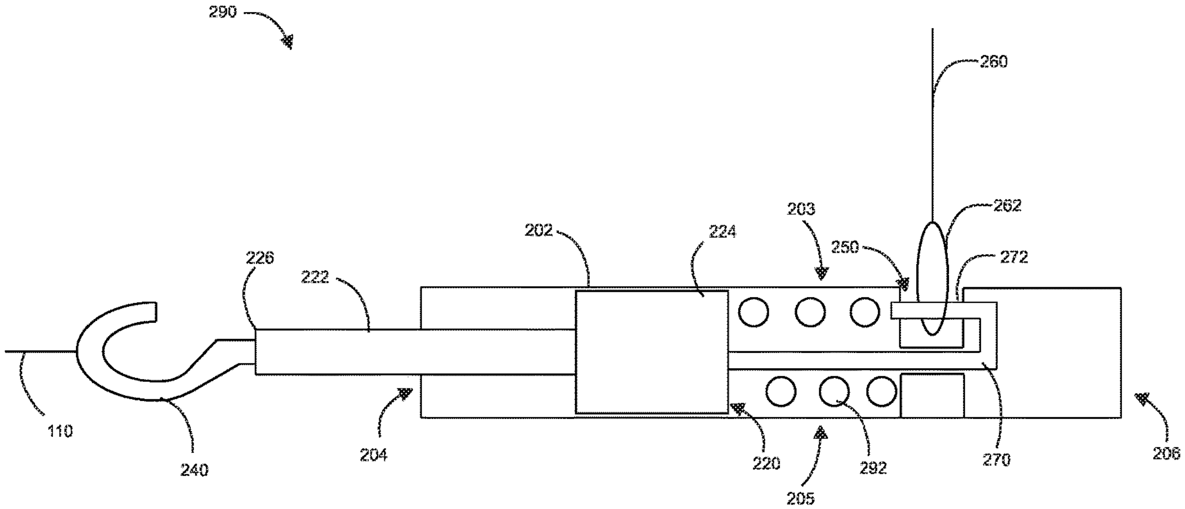
FIG. 3A is a schematic sectional view of the trigger device in the secured state, in accordance with one or more embodiments of the invention.
Figure 3B:
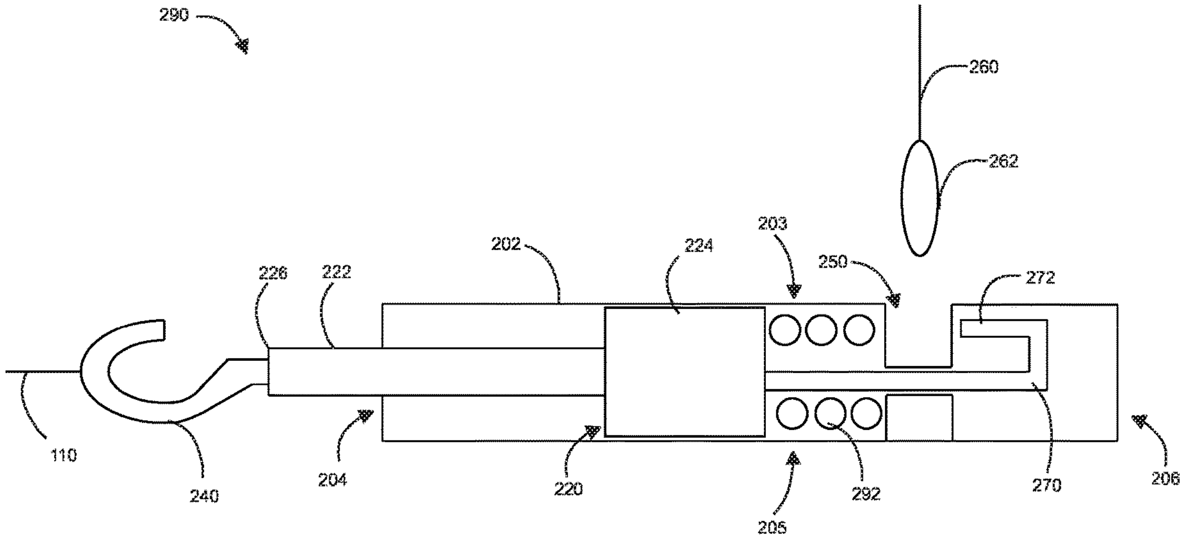
FIG. 3B is a schematic sectional view of the trigger device in the triggered state, in accordance one or more embodiments of the invention.

FIGS. 3A and 3B show exemplary schematic viewed of a trigger device 290 in the secured state and the triggered state, respectively. The trigger device 290 of FIGS. 3A and 3B may be substantially similar to the trigger device 200 of FIGS. 2A and 2B. Hence, common components between the trigger device 290 and the trigger device 200 are referenced using the same numeral references. However, the trigger device 290 includes a compressible element 292 disposed within the body 202 of the trigger device 290 and arranged between the piston head 224 and the second end 206 of the body of the trigger device 290.

The compressible element 292 is arranged such that, as the piston head 224 moves towards the first end 204 of the body 202 of the trigger device 290, the compressible element 292 is extended and thereby, offers a resistance to motion of the piston head 224. In other words, as the tension in the tensioned line 110 is intact, the piston head 224 is pulled towards the first end 204 of the body 202 of the trigger device 290, and the compressible element 292 is in an extended state. In some embodiments, the compressible element 228 includes a helical spring.

Referring now to FIGS. 1, 2A and 3A, the trigger device 290 is in a secured state. In such a state, the coupling element 270 is coupled with the actuation cable 260 via the ring 262 of the actuation cable 260. Here, the piston head 224 is towards the first end 204 of the body 202 and is held there by the tension in the tensioned line 110. As a result, the coupling element 270 is also coupled with the actuation cable 260, locking the actuation cable 260.

Referring now to FIGS. 1, 2B and 3B, the trigger device 290 is in a triggered state. In such a state, the coupling element 270 is decoupled from the actuation cable 260, resulting in the release of the actuation cable 260. In such a state, due to a breakage in one or more sensors 108, there is a loss of tension in the tensioned line 110. As a result, the piston head 224 is not held in position at the first end 206. The force of the extended compressible element 292 moves the piston head 224 towards the second end 206 of the body 202. As the piston head 224 moves towards the second end 206, the coupling element 270 also correspondingly moves towards the second end 206, and consequently, the free end of the coupling element 270 moves out of the slot 250, thereby decoupling with the ring 262 of the actuation cable 260. Hence, the actuation cable 260 is released, and the control box 120 is activated.

Figure 4:
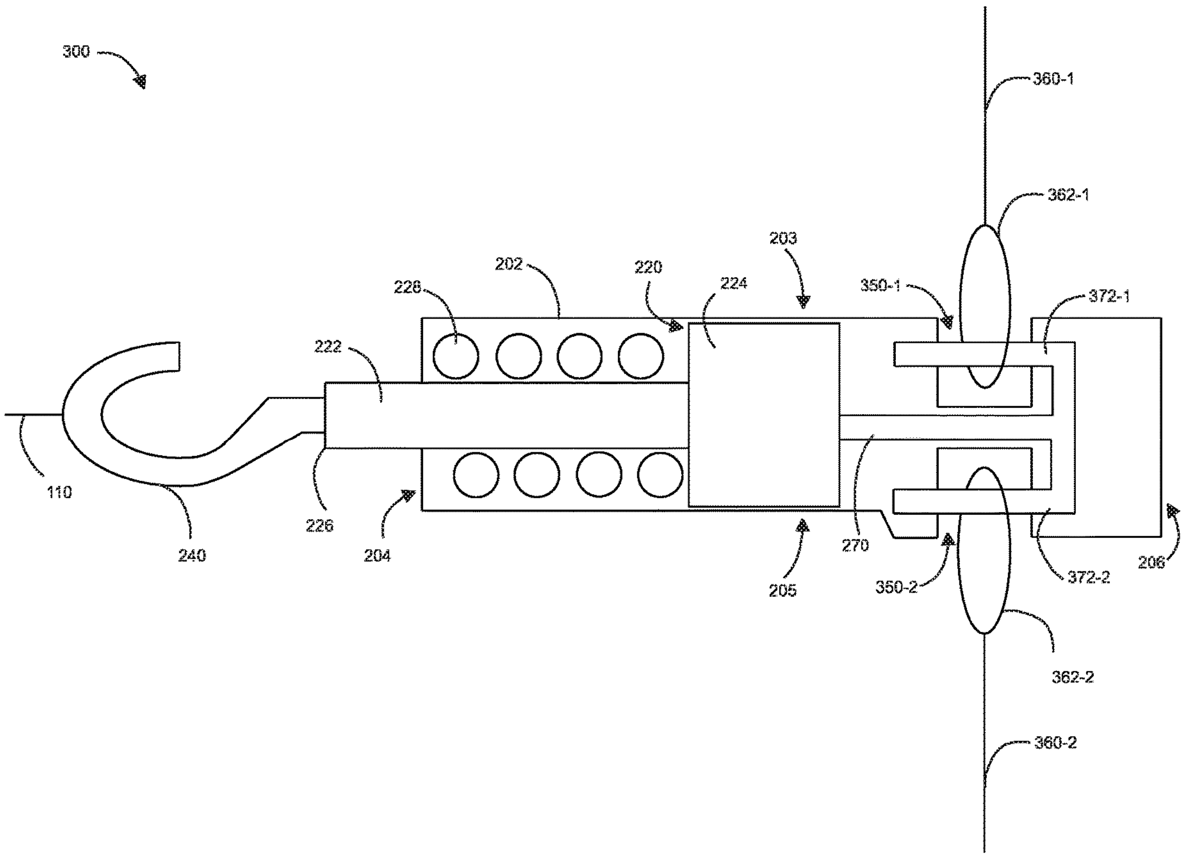
FIG. 4 is a schematic sectional view of a trigger device, in accordance with one or more embodiments of the invention.

Referring to FIG. 4, a schematic sectional view of a trigger device 300 is shown, in accordance with another embodiment of the invention. The trigger device 300 is substantially similar to the trigger device 200 of FIGS. 2A and 2B. Common elements between the trigger device 200 and the trigger device 300 is referenced using the same reference numerals. However, the trigger device 300 includes two slots 350-1, 350-2 that are adapted to receive two actuation cables 360-1, 360-2, respectively. Each of the two actuation cables 360-1, 360-2, includes a ring 362-1, 362-2. The rings 262-1, 362-2 may be received a respective slot 350-1, 350-2. In the illustrated embodiment of FIG. 4, the slots 350-1, 350-2 are arranged on the sides 203, 205, respectively, of the body 202 of the trigger device 300. A coupling element 370 of the trigger device 300 includes two coupling element hooks 372-1, 372-2 that are configured to slidably move through the slots 350-1, 350-2, respectively.

Thus, the trigger device 200, 290, 300 enable actuation of the control box 120 without relying on pneumatic high-pressure lines to move the piston 220. The piston 220 is moved by the force of the compressible element 228. As a result, the trigger device 200, 290, 300 may be simpler in construction and may offer a lower potential for hazardous conditions.

While the invention has been described with reference to exemplary embodiments, it will be understood by those skilled in the art that various changes may be made and equivalents may be substituted for elements thereof without departing from the scope of the invention as defined by the appended claims. Modifications may be made to adopt a particular situation or material to the teachings of the invention without departing from the scope thereof. Therefore, it is intended that the invention not be limited to the particular embodiment disclosed, but that the invention includes all embodiments falling within the scope of the invention as defined by the appended claims.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The invention claimed is:

1. A trigger device for a fire suppression system, the trigger device comprising:

a body comprising a first end and a second end, the first end of the body is configured to be operatively coupled to a tensioned line of a mechanical fire detection line of the fire suppression system;

a piston configured to be slidably disposed along a length of the body, the piston comprising a piston head and a connecting rod, wherein a free end of the connecting rod extends towards the first end of the body and is configured to be coupled to the tensioned line of the mechanical fire detection line;

one or more slots provided on the body, towards the second end of the body, wherein at least one of the one or more slots is configured to receive an actuation cable; and a coupling element coupled to the piston head and configured to slidably move along the length of the body responsive to movement of the piston head, the coupling element comprising a free end configured to move through the at least one of the one or more slots to selectively couple with the actuation cable, wherein responsive to the piston moving towards the second end of the body, the coupling element moves out of the at least one of the one or more slots to decouple with the actuation cable.

2. The trigger device of claim 1, further comprising a hook coupled to the free end of the connecting rod, and wherein the hook is configured to couple to the tensioned line.

3. The trigger device of claim 1, wherein responsive to the tensioned line losing tension, the piston is pushed towards the second end of the body.

4. The trigger device of claim 1, wherein the coupling element comprises a coupling element hook to selectively couple with the actuation cable.

5. The trigger device of claim 1, wherein the actuation cable comprises a ring and the coupling element includes a coupling element hook, the ring configured to selectively couple the actuation cable to the coupling element hook, wherein responsive to the coupling element hook moving in to the at least one of the one or more slots, the coupling element hook engages with the ring of the actuation cable, and wherein responsive to the coupling element hook moving out of the at least one of the one or more slots, the coupling element hook disengages with the ring of the actuation cable.

6. The trigger device of claim 1, wherein the coupling element comprises one or more coupling element hooks to selectively couple with one or more actuation cables received within corresponding one or more slots.

7. The trigger device of claim 1, further comprising a compressible element that is disposed between the piston head and the first end of the body, and wherein the compressible element is configured to be in a compressed state when the piston head is located towards the first end of the body.

8. The trigger device of claim 1, further comprising a compressible element that is disposed between the piston head and the second end of the body, and wherein the compressible element is configured to be in an extended state when the piston head is located towards the first end of the body.

9. The trigger device of claim 8, wherein the compressible element comprises a helical spring.

10. A fire suppression system comprising a trigger device for use with a mechanical fire detection line, the trigger device comprising:

a body comprising a first end and a second end, the first end of the body configured to be operatively coupled to a tensioned line of the mechanical fire detection line;

a piston configured to be slidably disposed along a length of the body, the piston comprising a piston head and a connecting rod, wherein a free end of the connecting rod extends towards the first end of the body and is configured to be coupled to the tensioned line of the mechanical fire detection line;

at least one or more slots provided on the body, towards the second end of the body, wherein the at least one of the one or more slots is configured to receive an actuation cable; and a coupling element coupled to the piston head and configured to slidably move along the length of the body responsive to movement of the piston head, the coupling element comprising a free end configured to move through the at least one of the one or more slots to selectively couple with the actuation cable, wherein responsive to the piston moving towards the second end of the body, the coupling element moves out of the at least one of the one or more slots to decouple with the actuation cable.

11. The fire suppression system of claim 10, wherein the trigger device further comprises a hook coupled to the free end of the connecting rod, and wherein the hook is configured to couple to the tensioned line.

12. The fire suppression system of claim 10, wherein responsive to the tensioned line losing tension, the piston is pushed towards the second end of the body.

13. The fire suppression system of claim 10, wherein the coupling element comprises a coupling element hook to selectively couple with the actuation cable.

14. The fire suppression system of claim 13, wherein the actuation cable comprises a ring configured to selectively couple the actuation cable to the coupling element, wherein responsive to the coupling element hook moving in to the at least one of the one or more slots, the coupling element hook engages with the ring of the actuation cable, and wherein responsive to the coupling element hook moving out of the at least one of the one or more slots, the coupling element hook disengages with the ring of the actuation cable.

15. The fire suppression system of claim 10, wherein the coupling element comprises one or more coupling element hooks to selectively couple with one or more actuation cables received within corresponding one or more slots.

16. The fire suppression system of claim 10, further comprising a compressible element that is disposed between the piston head and the first end of the body, and wherein the compressible element is configured to be in a compressed state when the piston head is located towards the first end of the body.

17. The fire suppression system of claim 10, further comprising a compressible element that is disposed between the piston head and the second end of the body, and wherein the compressible element is configured to be in an extended state when the piston head is located towards the first end of the body.

18. The fire suppression system of claim 17, wherein the compressible element comprises a helical spring.

* * * * *